United States Patent [19]
Thomsen

[11] Patent Number: 4,904,382
[45] Date of Patent: Feb. 27, 1990

[54] FILTER CARTRIDGE AND HEAD THEREFOR, INCLUDING PUSH-PULL CARTRIDGE RETAINING SLIDE MEMBER

[75] Inventor: Jack W. Thomsen, La Grange Park, Ill.

[73] Assignee: Everpure, Inc., Westmont, Ill.

[21] Appl. No.: 124,156

[22] Filed: Nov. 23, 1987

[51] Int. Cl.$^4$ .............................................. B01D 27/08
[52] U.S. Cl. .................... 210/236; 210/238; 210/335; 210/340; 210/390; 210/440; 210/444; 210/446; 55/422; 55/502; 55/504
[58] Field of Search .............. 210/232, 235, 236, 238, 210/240, 357, 390, 418, 429, 440, 443, 446, 447, 444, 335, 340; 55/422, 502, 504

[56] References Cited

U.S. PATENT DOCUMENTS

| | | | |
|---|---|---|---|
| 2,338,291 | 1/1944 | McIntosh | 210/240 |
| 2,991,885 | 7/1961 | Gutkowski | 210/429 |
| 3,529,515 | 7/1975 | Selz | 210/235 |
| 3,914,176 | 10/1975 | Holmes | 210/240 |
| 4,529,514 | 7/1985 | Gruett | 210/235 |
| 4,556,484 | 12/1985 | Hunter et al. | 210/240 |
| 4,735,716 | 4/1988 | Petrucci et al. | 210/232 |

FOREIGN PATENT DOCUMENTS

| | | | |
|---|---|---|---|
| 1134659 | 8/1962 | Fed. Rep. of Germany | 210/240 |
| 14914 | 1/1985 | Japan | 210/240 |

*Primary Examiner*—Richard V. Fisher
*Assistant Examiner*—Wanda L. Millard
*Attorney, Agent, or Firm*—Frank R. Thienpont

[57] ABSTRACT

A filtering system for water treatment incorporating one or more filter assemblies each including a head member having fluid inlet and outlet ports, a replaceable filter cartridge closed at one and the other end being insertable into said head member, said head member including a manifold member and a filter cartridge supporting member operatively associated with the head member and movable relative to the manifold member between a load-unload position and an operating or running position, means for securing the filter cartridge against rotation in the filter cartridge supporting member, and seal means between the manifold member and filter cartridge supporting member for sealing off both the influent and effluent when the filter cartridge supporting member is in the load/unload position.

63 Claims, 9 Drawing Sheets

FIG_7_

FIG_7A_

FIG_7B_

FILTER CARTRIDGE AND HEAD THEREFOR, INCLUDING PUSH-PULL CARTRIDGE RETAINING SLIDE MEMBER

BACKGROUND OF THE INVENTION

This invention relates to a filtering system and/or a fluid treatment system and more particularly to an improved filter assembly which includes a replaceable filter cartridge which can be quickly inserted into and removed from a head member which is permanently mounted in a fluid conduit.

The filter assembly of the present invention has particular, although not exclusive, application to systems for potable water treatment such as filtration for beverage vending machines, food service, ice makers, and homes.

Ease of serviceability, avoidance of messy surroundings where the filter assemblies are employed, avoidance of leaky filter assemblies and simplification of filter assembly hook-ups are just some of the desirable goals sought to be achieved. The invention herein is directed to making further overall improvements pursuant to these goals.

SUMMARY OF THE INVENTION

A principal object of the invention is to provide an improved filter assembly adapted to be disposed in a fluid conduit and constructed and arranged so as to provide for the efficient and easy insertion and exchange of a removable filter cartridge into the assembly.

Another object of the invention is to provide for loading and unloading filter cartridges into and from the assembly without the necessity of using any tools.

Another object is to provide a head assembly including a slide mechanism adapted to have a replaceable filter cartridge mounted therein which facilitates positioning a filter cartridge in an operating position in a fluid conduit Another object is to provide in a filter assembly a filter cartridge retaining slide mechanism in association with the manifold of the filter assembly for facilitating the replacement of a removable filter cartridge in the filter assembly.

Another object of the invention is to provide in a filter assembly a seal means which allows the replacement of a filter cartridge in a filtering system without leakage from either the influent or effluent side.

Another object of the invention is to provide a head assembly in a filtering system which may accommodate alternative slide mechanisms which are constructed and arranged to accept differently constructed filter cartridge units.

Another object of the invention is to provide an improved filter head assembly which can be used as a single unit or which may be used as one of a group of units arranged in either parallel or series connections to accommodate a plurality of filter cartridge.

A still further object is to provide a head assembly which when used as one of a number of units arranged in parallel or series can be individually serviced without the necessity of interrupting the operation of the other units.

Another object is to provide for automatic sealing off of both influent and effluent during the process of replacing a filter cartridge in a filter assembly.

Other objects and advantages of the invention will become more apparent from the following description considered in conjunction with the accompanying drawings.

DESCRIPTION OF THE PREFERRED EMBODIMENT

Figure 1:
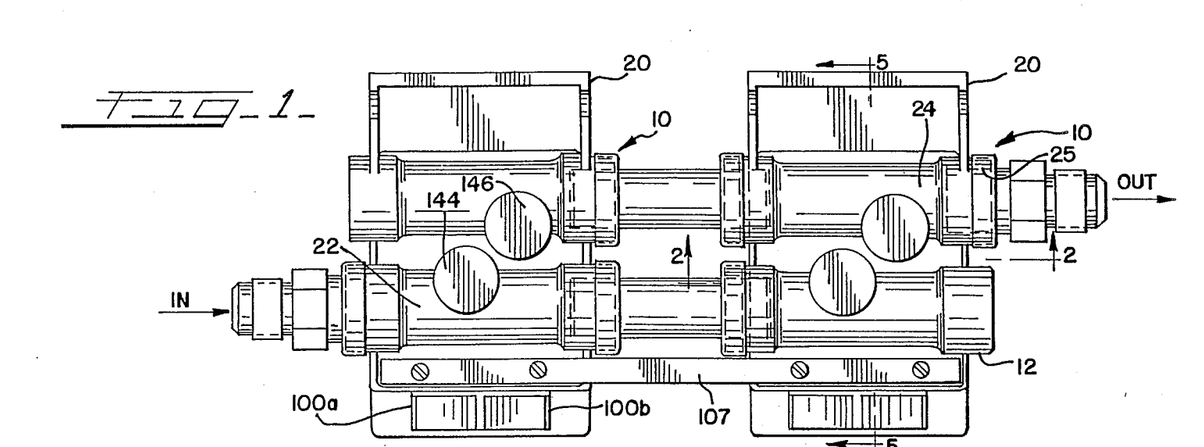
FIG. 1 is a plan view of two filter assembly head members embodying the invention herein with horizontally extending inlet and outlet conduits, and connected in parallel as part of a filtering system.
Figure 6:
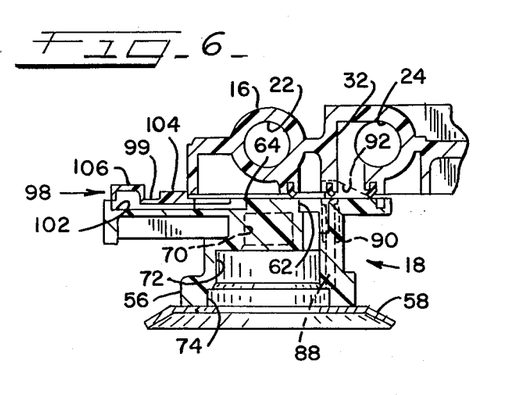
FIG. 6 is a view similar to that of FIG. 5 but showing the slide member in a load/unload position.

Referring now to the drawings wherein like reference characters in the various drawings refer to like parts, the filter assembly 10 includes a head assembly 12 and a filter cartridge 14. The head assembly 12 includes a manifold member 16 and a slide member 18 which carries the filter cartridge 14. A mounting bracket 20 for fixedly mounting the head member 12 may be integrally formed on the manifold member. While it is common to use one filter assembly 10 in a filtering system, multiple filter assemblies 10 also may be incorporated into a filtering system. FIG. 1 shows two such interconnected filter assemblies 10 connected in a parallel arrangement and more may be added into the system The head assemblies in each such filter assembly are for the most part identical and accordingly the construction of only one need be described. FIG. 6B shows two such interconnected filter assemblies connected in a series arrangement.

Figure 4:
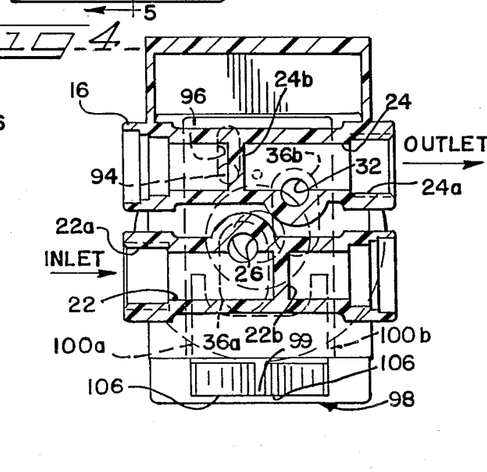
FIG. 4 is a plan view in cross-section of the filter head assembly taken along line 4—4 of FIG. 2.

The manifold member 16 which preferably is made of a molded hard plastic material but may also be made of metal, may be constructed with generally horizontally disposed and substantially parallel main inlet and outlet conduits 22 and 24 with respective inlet and outlet ports 22a and 24a. Suitable plumbing connections 25 such as threads or slip joints for O-ring seals are provided at the inlet and outlet ports for attachment of fluid inlet and fluid outlet to the manifold member. The conduits 22 and 24 are continuous through the manifold for parallel hook-ups or they may extend only partially through the manifold with partitions 22b and 24b as seen in FIG. 4 for a single head hook-up or in a series hook-up. This presents the only difference in head member construction when used as a single unit or in a series arrangement. It will be apparent that the conduits 22 and 24 as shown in FIG. 4 may be made straight through conduits merely by drilling holes through the partitions 22b and 24b. Intersecting with inlet conduit 22 is an inlet bore 26 which terminates in opening 28 in the lower face 30 of the manifold member 16. Intersecting with outlet conduit 24 is an outlet bore 32 which terminates in opening 34 also in the lower face 30 of the manifold member 16.

The manifold member 16 also may be constructed with generally vertically disposed main inlet and outlet conduits as hereinafter more fully described.

Figure 8:
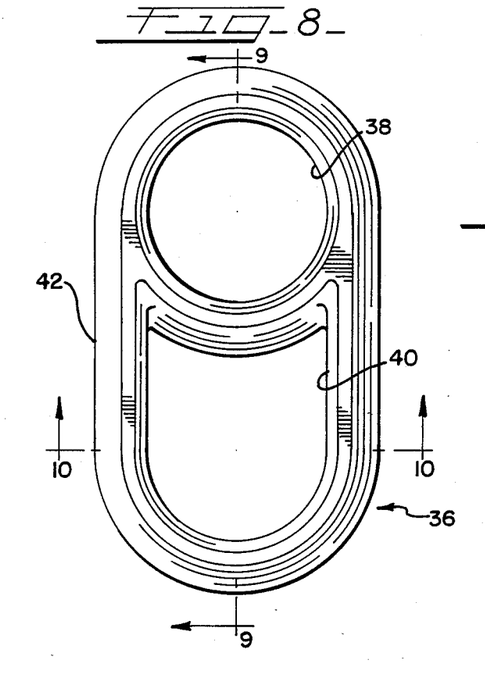
FIG. 8 is a top plan view of a special seal member used in the filter head as shown in FIGS. 2, 5 and 6.
Figure 9:
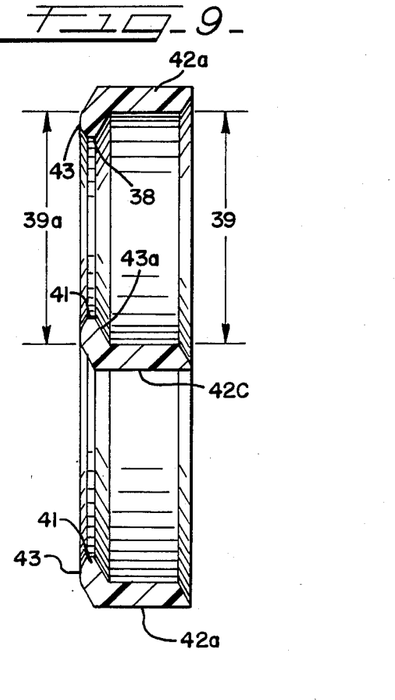
FIG. 9 is a cross-sectional view of the seal member of FIG. 8 taken along line 9—9 in FIG. 8.
Figure 10:
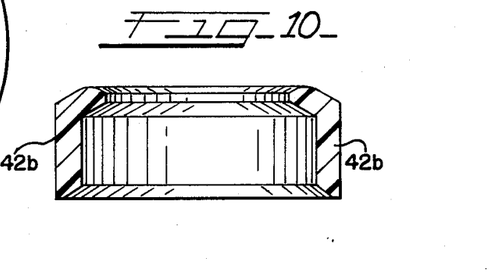
FIG. 10 is a cross-sectional view of the seal member of FIG. 8 taken along line 10—10 in FIG. 8.

A pair of identical substantially oval shaped elastomeric face seal members 36a and 36b as exemplified by the seal member 36 shown in FIGS. 8, 9 and 10, are disposed in the lower face 30 of the manifold member 16. The lower face 30 is essentially a flat surface. The seal member 36 is formed with two openings 38 and 40. The opening 38 is an annular opening and opening 40 is a non-annular opening. The opening 38 of each of the seal members 36a and 36b is of such size as to generally surround the inlet opening 28 and outlet opening 34 respectively of the manifold member. Each of the seal members is formed with generally axially extending wall portions 42 including curved end walls 42a, side walls 42b and a central wall portion 42c extending between the sidewalls, which fit into retaining slot 44 formed in the lower surface 30 of the manifold member for securing the seal members in place. An inwardly projecting seal lip 41 is formed at one edge of the wall portions 42. The underside of seal lip 41 defines a seat or sealing surface 43 and the upper side 43a of the seal lip 41 defines a pressure surface. The sealing surface 43 which may be slightly rounded or arched maintains a sliding sealing engagement with the upper surface of the slide member 18. In an operating environment fluid pressure exerted on pressure surface 43a helps to maintain a seal between the sealing surface 43 and the slide member 18.

The seal member 36 is designed with an internal diameter 39 of the seal preferably larger than the outer diameter 39a of the sealing surface 43. This makes it possible under operating conditions for the fluid pressure acting on the seal member, whether it be the seal member associated with the outlet pressure or inlet pressure, to act on the upper surface 43a of the seal lip 41 to effect a better sealing engagement between the sealing surface 43 and the upper surface of the slide member 18 and thus prevent leakage between the sealing surface 43 and the slide member 18.

A pair of longitudinally extending rail members 46 and 48 are attached to the lower face of the manifold member 16 by screws or other suitable means The rail members 46 and 48 have formed thereon inturned shoulders 50 and 52 respectively for slidingly supporting thereon the slide member 18.

The slide member 18 is designed to move between two positions—a rear position which is the "operating" or "running" position and a forward position which is the "non-operating" or "load/unload" position In the operating or running position the slide member is in position to permit the flow of fluid from the manifold inlet through an attached filter cartridge and to the manifold outlet. In the non-operating or load/unload position the slide member is in position to disallow the flow of fluid and permit the removal and replacement of a filter cartridge carried by the slide member. The slide member 18 is designed to carry a removable filter cartridge which may be put into operation in the fluid system merely by sliding the slide member into a fluid transmitting position in the head member. Because of this mode of operation the entire unit is sometimes referred to as a Push-Pull filter assembly. The slide member 18 is formed with a substantially rectangular upper plate portion 54 and a filter cartridge retaining inverted cup portion 56 which depends from and is integrally formed with the plate portion 54. A cartridge retainer plate 58 is attached to the lower end of the cup portion 56. The slide member's upper plate portion 54 and cup portion 56 preferably are made of hard plastic material to avoid corrosion problems, but also may be made of metal. The outer edges 54a and 54b of the upper plate portion 54 are slidingly supported on the shoulders 50 and 52 respectively of the rail members 46 and 48 and are so fitted with the rail members 46 and 48 that the latter are effective to keep the slide member in sealing engagement with the seal members 36a and 36b.

Figure 2:
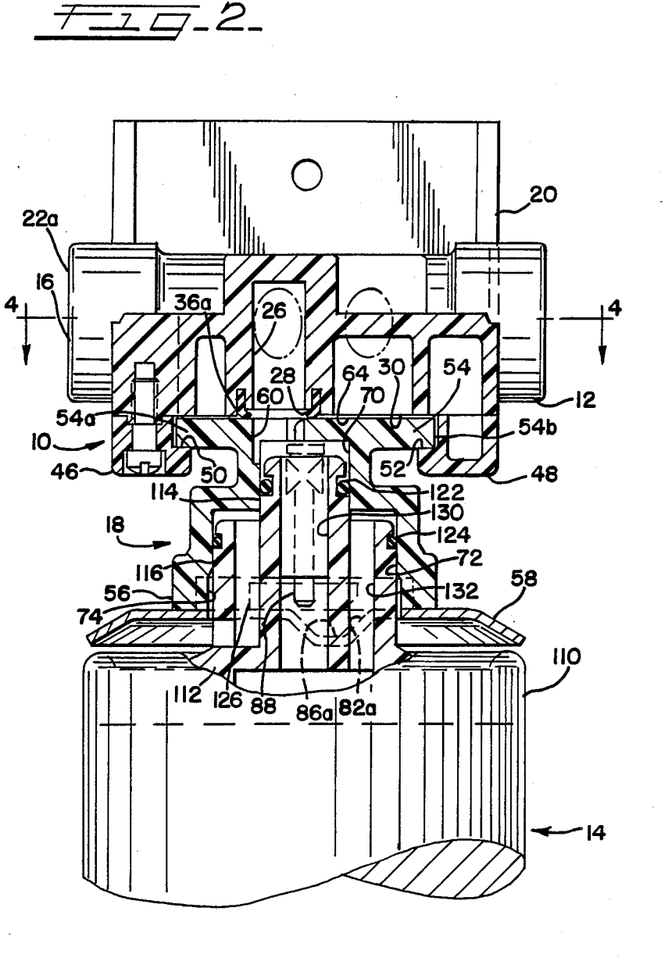
FIG. 2 is a cross-sectional view in elevation of a filter head assembly of FIG. 1 taken at line 2—2 of FIG. 1.
Figure 3:
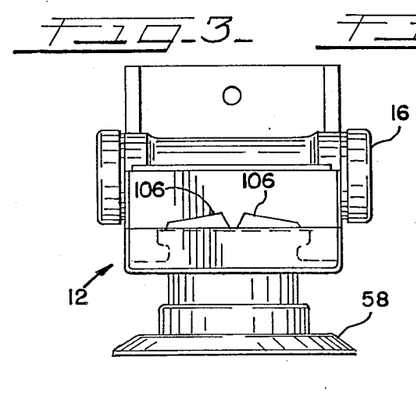
FIG. 3 is a front view in elevation of the left hand filter head unit of FIG. 1.

Inlet and outlet bores 60 and 62 are formed in the upper plate portion and extend through the upper face 64 of the slide member. These bores 60 and 62 are positioned to establish fluid communication with the inlet and outlet bores 26 and 32 formed in the manifold member when the slide member and its associated filter cartridge are in an operating or running position. Bores 60 and 62 also intersect respectively with bores 70 and 72 formed in the underside of the slide member in the cartridge retaining cup portion 56. As shown in FIG. 2 the cartridge retaining cup portion is formed with the two concentric bores 70 and 72 for accepting the mating closure member or upper end of a filter cartridge as subsequently explained more fully. It should be noted that the inverted cup portion 56 may be constructed with different bore shapes to accommodate different shapes of closure members on other filter cartridge units as shown, for example, in FIGS. 11–13. The cup portion 56 also is formed with a recess or counterbore 74 at its lowermost end. Stop means in the form of at least one stop member 84a or 84b or both is formed in the counterbore to coact with a portion of a filter cartridge member after it is inserted into the slide member to assist in securely positioning the filter cartridge in the slide member.

The cartridge retainer plate 58 is attached to the lower end of the slide member by screws or other suitable means. The retainer plate 58 is formed with a central opening 78 for receiving therethrough the closure member or upper end of a filter cartridge. Bayonet openings 80a and 80b are connected to and formed as part of the central opening 78 for receiving therethrough bayonet lugs formed on the closure member or upper end of the filter cartridge. On the edge of opening 78 there may be formed a pair of sloping cam surfaces 82a and 82b for camming the filter cartridge into a position upwardly as shown in FIG. 2, into sealing engagement with the bores 70 and 72 as the filter cartridge is rotated to be loaded. Bosses or stops 84a and 84b are formed in recess of counterbore 74 to limit the rotation of the filter cartridge upon insertion. Flattened surfaces 86a and 86b are formed at the lower end of the cam surfaces 82a and 82b to form a resting place for the filter cartridge when it is being unloaded.

Figure 5:
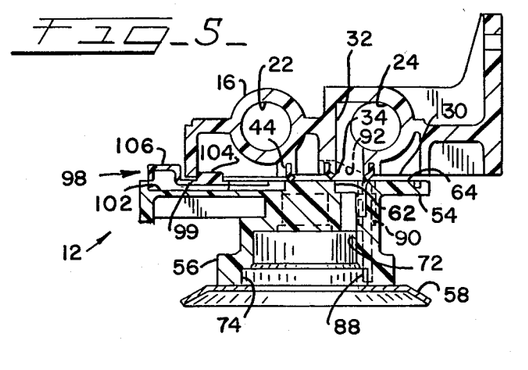
FIG. 5 is a cross-sectional view in elevation taken along line 5—5 of FIG. 1, showing the slide member disposed in association with the manifold member in a running position.

The slide member also includes a safety interlock mechanism for preventing counter rotation of the filter cartridge when the slide member is in the running or operating position. This interlock mechanism includes a spring-loaded locking pin member 88 which extends through the slide member. The pin member 88 normally is urged to a raised position by the spring 90 when the slide member 18 is in the load/unload position as shown in FIG. 6. As the slide member 18 is moved to its running position as shown in FIG. 5, after insertion of a filter cartridge, the pin 88 is urged downwardly by the cam incline 92 to a position in engagement with one of the bayonet lugs on the filter cartridge thus preventing counter rotation of the filter cartridge. When the slide member is again moved to its load/unload position the spring 90 urges the pin member to its upward position along the cam incline 92 out of contact with the bayonet lug on the filter cartridge thus allowing the filter cartridge to be rotated backward to a position from which it can be removed from the head member.

A slide travel limiting mechanism is provided to control the length of travel of the slide member 18 relative to the manifold member 16. To that end a pin member 94 is attached to the manifold member 16 and engages a slot 96 formed in the slide member 18. This limits the push-pull travel of the slide member beyond either the load/unload or running positions.

A latch mechanism 98 is provided to secure the slide member 18 in either the load/unload position or the running position. The latch mechanism 98 includes a flexible portion 99. This flexible portion 99, preferably a thin plastic sheet, has its edges 100a and 100b secured in a well 102 formed in the slide member 18. An elongated detent 104 is formed on the upper surface of the flexible plastic sheet substantially midway between the edges 100a and 100b. When the slide member 18 is in the load/unload position as seen in FIG. 6, one end of the detent 104 engages the lower outer edge of the manifold member thus latching the slide member against movement out of the load/unload position toward the "running" position. By pushing down on the raised portions 106 formed at the outer end of the flexible portion 99, the flexible portion 99 will bend at its center down into the well 102 carrying the detent 104 below the edge of the manifold member and permitting the slide member to be pushed to its running position as shown in FIG. 5. It will be observed from FIG. 5 that in the running position the other end of the detent 104 engages the inner lower edge of the manifold 16, flexible portion 99 now having returned to its unflexed position, and the slide member 18 is secured in the running position.

Where multiple heads are used in a filtering system in either a parallel or series arrangement, tie bar 107 interconnecting two or more heads may be used as shown in FIGS. 1 and 6B. The tie bar 107 may be a strip of metal or plastic mounted by suitable means such for example as, rivets or screws as shown. The purpose of the tie bar 107 is to hold the fronts of the manifolds in a stationary position and prevent pressure contained in the horizontal inlet and outlet conduits from causing the manifolds to fan apart or separate at the slip joints.

The filter cartridge 14 as shown in FIG. 2 includes a pressure vessel 110 which is closed at its lower end and a closure member 112 which is fitted into the open end of the pressure vessel in sealed engagement therewith. The filter cartridge 14 insofar as the pressure vessel and closure member and the inner workings including the filter are concerned may be substantially like the filter cartridge disclosed in U.S. Pat. No. 3,746,171 assigned to the same assignee as this application. It will be appreciated that different filter elements may be disposed in the pressure vessel to perform different functions. The closure member 112 is provided with two coaxiam bosses 114 and 116, the smaller 114 extending axially beyond the larger 116. The bosses define an inlet conduit to and an outlet conduit from the pressure vessel. A pair of O-ring seals 122 and 124 are positioned on the bosses to provide a sealing engagement with the bores 70 and 72 formed in the slide member.

An axially disposed fluid conduit 130 extends through the closure member 112 and through the smaller boss 114 and connects with the interior of the pressure vessel 110. Another fluid conduit 132 is formed between the boss 114 and the inner wall of boss 116 and is connected with the filter element in the pressure vessel. As herein described the conduit 130 comprises the inlet to the filter cartridge and conduit 132 comprises the outlet from the filter cartridge.

Figure 7:
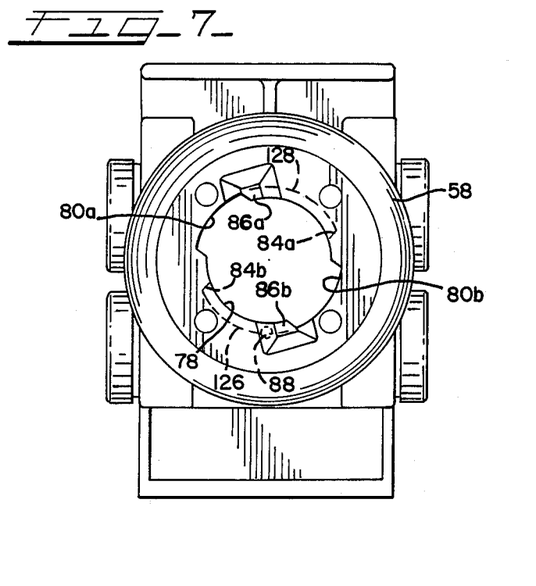
FIG. 7 is a bottom plan view of FIG. 3 showing the filter cartridge retaining plate.
Figure 7A:
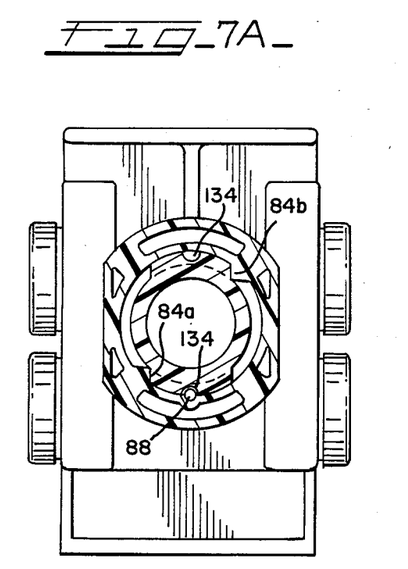
FIG. 7A is a bottom plan view of FIG. 3 partially in section, showing modified lugs on a filter cartridge, the lugs having a notch for receiving a locking pin.
Figure 7B:
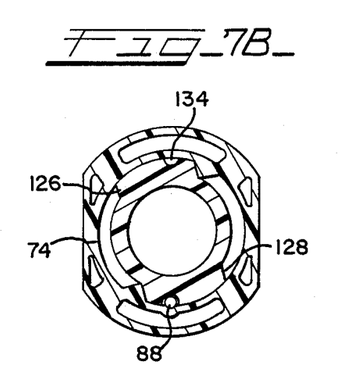
FIG. 7B is another bottom plan view of FIG. 3, partially in section, showing a still further modification of the lugs on a filter cartridge.
Figure 7C:
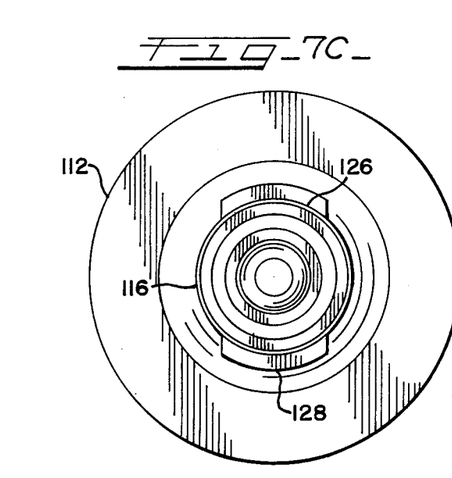
FIG. 7C is a top plan view of the filter cartridge closure member of FIG. 2 showing diametrically opposed bayonet lugs on the closure member.

A pair of bayonet lugs 126 and 128, one of which is shown in FIG. 2 and both of which are shown in FIG. 7C, are formed on the outer surface of the larger boss 116. In the assembled unit these bayonet lugs rest on the retainer plate 58 and are effective to support the filter cartridge in the slide member 18. In the assembled condition and with the slide member 18 in the running position the locking pin 88 of the interlock mechanism is urged into place behind the bayonet lug thus preventing counter rotation of the filter cartridge out of the retained position.

Modifications of the interlock feature are shown in FIGS. 7A and 7B. In the construction of FIG. 7A the bayonet lugs have formed therein a retaining recess or notch 134 midway between the ends of the lug for engaging the locking pin 88. It will be observed that with the end of the bayonet lug disposed against the stop 84b and the locking pin 88 disposed in the notch 134 the filter cartridge is secured against rotation in either direction.

The retaining notch may be positioned at different locations in the bayonet lugs offset from the center line. One such modification is shown in FIG. 7B. Just as it is preferable to have the bayonet lugs on the filter cartridge closure member disposed diametrically opposite each other for ease of installation so also it is preferable to position retaining notches on the bayonet lugs diametrically opposite each other for the same reason. It will be appreciated that in such off-center modification the stop member 84b formed in the recess 74 of the slide member also will have to be correspondingly moved. The recess 134 also may be a hole through the bayonet lug for accepting locking pin 88.

This orientation of the notch location also provides a means of keying a specific type of cartridge to a specific manifold/head unit. This feature may be used in a multiple head system where a special "dosing" cartridge would be desired in parallel with other filter cartridges. This special "dosing" cartridge may be a controlled feeding device to add a sequestrant or a scale inhibitor, to the water supply at a particular point in the water treatment process in a multiple head hook-up.

While the filtering system as shown in FIG. 1 shows the interconnecting conduits as providing a parallel arrangement, a plurality of filter assemblies also may be interconnected to provide a series arrangement. Such a series arrangement is shown in FIG. 6B. In such a series arrangement it is possible to incorporate several filter cartridges each containing different filter elements to successively perform different functions. The filter element of the first filter cartridge, for example, may filter out relatively larger, coarser particles, the second filter may filter out undesirable organic chemicals, the third may further remove finer particles, thus yielding good tasting, healthy, and clear water. In this series arrangement of FIG. 6B the fluid flow is from left to right and follows the arrows as shown, with the outlet conduit of the left hand unit being connected by appropriate conduit means to the inlet conduit of the right hand unit.

In such a series arrangement it would be particularly appropriate to provide means for easily differentiating the removable filter cartridges which are to be selectively inserted into the respective filter heads of the filtering system. Such differentiation may be accomplished by positioning the recess or notches 134 in the filter cartridge bayonet lugs of the different filter cartridges in different locations as described above. For example, in the filter cartridge to be used to filter out relatively larger particles the notches might be located at the middle of the bayonet lug as shown in FIG. 7A; in the filter cartridge to be used to filter out undesirable organic chemicals the notches 134 can be located to one side or the other of the middle position, i.e., fore toward one end of the bayonet lug; and if a third filter is being used the notches in the bayonet lug can be located toward the other end of the bayonet lug. Obviously in each case of a different location of the notches in the bayonet lugs, the corresponding movable pin means of the interlock mechanism in the slide member must be repositioned to match that particular location of the notches in the bayonet lugs. If insertion of a cartridge in an improper slide member is made, when a further attempt is made to move the slide member into a running position, misalignment of the pin means with the notch of the bayonet lug will prevent the slide member from being moved to the running position. Cartridge differentiation means as described above obviously may be used whether a series or parallel arrangement is being used.

Although the operation of the filter assembly should be reasonably clear from the above description and accompanying drawings the following is a summary of the operation.

With the slide member in the load/unload position a filter cartridge 14 is inserted into the slide member by lining up the bayonet lugs 126 and 128 on the filter cartridge closure member with the bayonet openings 80a and 80b in the cartridge retainer plate 58. Upon rotation of the filter cartridge the bayonet lugs 126 and 128 will ride up the sloping cam surfaces 82a and 82b till the lugs hit the stops 84a and 84b thus lifting the filter cartridge closure member into sealing engagement with the bores 70 and 72 in the slide member. At this point the bayonet lugs are positioned in the counterbore or recess 74 between the retainer plate 58 and the shoulder of the counterbore 74 so that the retainer plate 58 retains the filter cartridge in the slide member. Until the cartridge is fully rotated to the stop means 84a and 84b the slide member 18 cannot be pushed to the running position because of the locking pin 88.

Now the raised portions 10b of the latch mechanism 98 are depressed thus releasing the detent 104 from engagement with the manifold member 16. The slide member is then pushed to the operating or running position as shown in FIG. 5 and the latch mechanism is released permitting the detent 104 to assume the position shown in FIG. 5 and locking the slide member in that position with the help of the slide member travel limiting device, rely the pin 94 and slot 96 arrangement. At this point the locking pin 88 has been urged by the cam incline 92 to a position behind the bayonet lug or into one of the notches 134 formed in the bayonet lug depending on whether the structure of FIGS. 7, 7A or 7B are utilized.

In the operating position the inlet and outlet bores in the slide member are lined up with the inlet and outlet bores in the manifold member and with the openings 38a and 38b in the two seal members 36a and 36b. In the operating position the sealing effect which takes place by the slide member 18 pushing up against the sealing surface 43 is enhanced by the fact that the pressure in the fluid system acts on the backside of the seal lip 41 to press the seal lip 41 down onto the upper face 64 of the slide member 18.

When it comes time to replace the filter cartridge 14 the latch mechanism 98 is manipulated by pressing down on the raised portions 106 thus moving the detent 104 downwardly from its position as shown in FIG. 5 This allows the slide member to be moved to the load/unload position as shown in FIG. 6. During this latter movement the spring actuated pin 88 is allowed to move up the car: incline 92 from its position behind one of the bayonet lugs on the closure member of the filter cartridge, allowing the filter cartridge to be rotated backwards down the cam surface 82a and 82b and to come to rest on the flattened surfaces 86a and 86b. The filter cartridge can then be further rotated to permit the bayonet lugs of the filter cartridge closure member to be passed through the bayonet openings 80a and 80b effecting removal of the filter cartridge from the slide member.

It will be noted that as the slide member 18 is moved to the load/unload position of FIG. 6 the upper face 64 of the slide member maintains contact with the seal lips 41 and that line pressure or back pressure in the inlet and outlet conduits will assist in providing a sealing pressure on that portion of lips 41 surrounding openings 28 and 34 in the manifold member thus preventing leakage. Similarly residual pressure in the filter cartridge will act on the backside 43a of that portion of seal lip 41 surrounding opening 40 to help prevent leakage from the filter cartridge itself as the slide member is moved to the load/unload position.

In an alternate construction as shown in FIGS. 14-19 with changes directed to the manifold member portion, a manifold member 216 may be constructed with generally vertically extending inlet and outlet conduits 222 and 224 with respective inlet and outlet ports 222a and 224a. Inlet conduit 222 terminates in opening 228 in the lower face 230 of the manifold member 216. Outlet conduit 224 terminates in opening 234 also in the lower face 230 of manifold member 216. The similarity of manifold member 216 to manifold member 16 will be appreciated from the similar designation of portions thereof with like reference characters prefixed by a 200 series of similar reference characters.

The filter head assembly utilizing generally vertically extending inlet and outlet conduits in the manifold member is perhaps best adapted to use as only a single head member whereas the head member utilizing generally horizontally extending inlet and outlet conduits may be somewhat better adapted when a number of filter head assemblies connected in parallel is contemplated although it can not be said that either one should necessarily be used exclusively for that particular environment.

Figure 11:
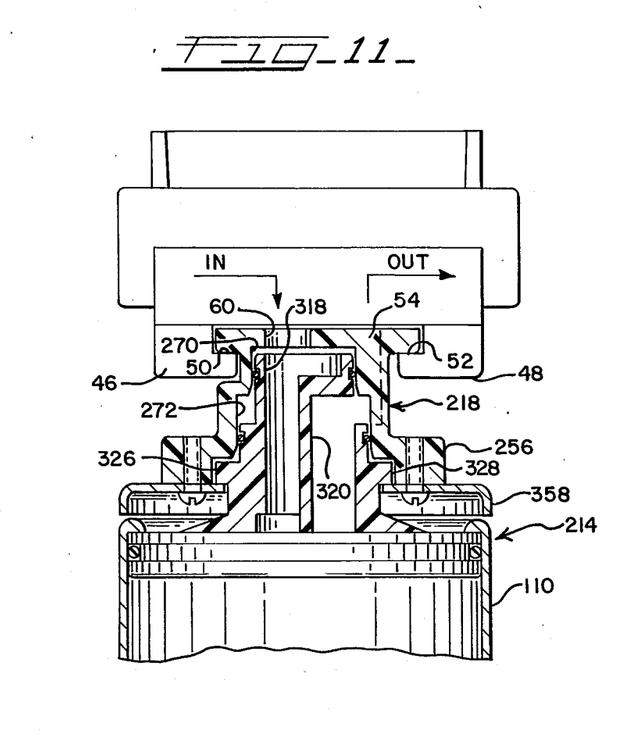
FIG. 11 is a part cross-sectional view in elevation of a filter assembly of the invention including a slide member having a slightly different internal configuration to accommodate a filter cartridge closure member of slightly different design.
Figure 12:
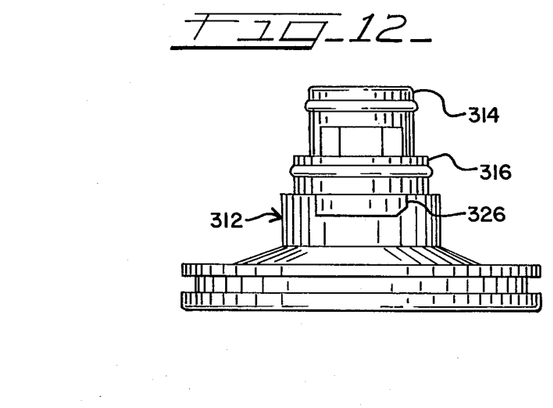
FIG. 12 is a view in elevation of a filter cartridge closure member as shown in FIG. 11.

In the embodiment of FIG. 11 there is shown a slide member 218 the cup portion 256 of which is modified on its underside to receive a filter cartridge having a closure member 312 of a slightly different configuration than the closure member 112 as shown in FIG. 2. A filter cartridge closure member substantially like that of FIG. 12 is disclosed in U.S Pat. No 4,654,142 assigned to the same assignee as this application.

The cup-like portion 256 of slide member 218 in the embodiment of FIG. 11 is formed with a pair of concentric bores 270 and 272 for receiving therein respectively the concentric boss portions 314 and 316 formed on the closure member. The closure member 312 is formed with axially extending inlet and outlet bores 318 and 320 which communicate at their lower ends as shown in the drawing with a filter element (not shown) in the pressure vessel 110 of the filter cartridge 214. The inlet bore 318 communicates with inlet bore 60 in the slide member which in turn is adapted to communicate with the inlet conduit 26 in the manifold member when the slide member is in the operating or running position. The outlet bore 320 communicates with outlet bore 62 in the slide member which in turn is adapted to communicate with outlet bore 32 in the manifold member 16 when the slide member is in the operating or running position.

Figure 13:
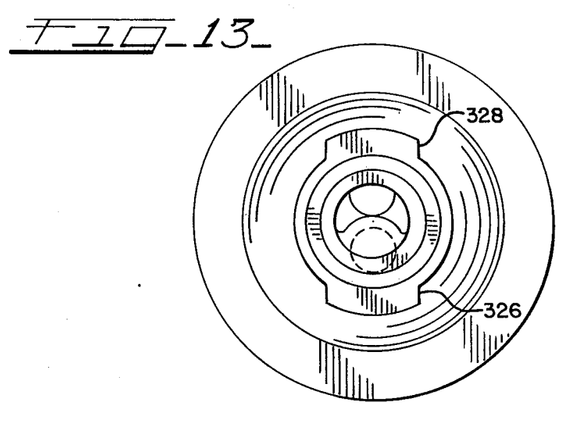
FIG. 13 is a plan view of the filter cartridge closure member of FIG. 12.
Figure 14:
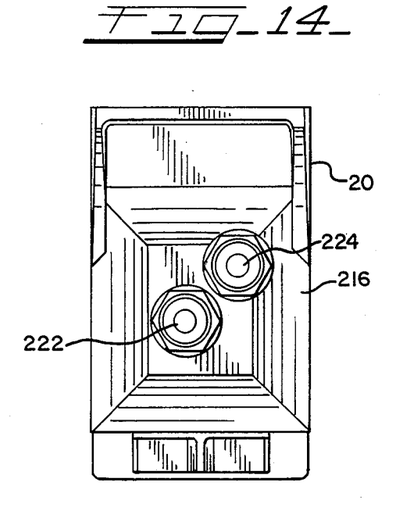
FIG. 14 is a plan view of a modified form of a filter head assembly embodying the invention herein.
Figure 15:
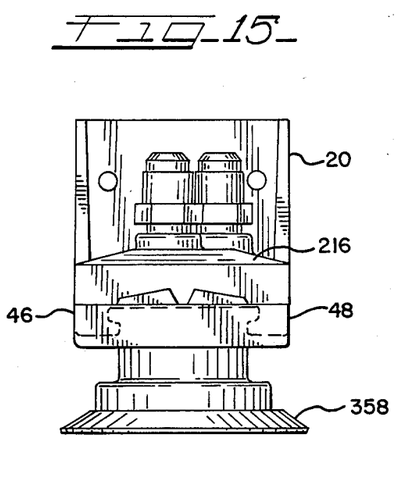
FIG. 15 is a front view in elevation of the filter head assembly of FIG. 14 showing vertically extending inlet and outlet conduits in the head member.
Figure 16:
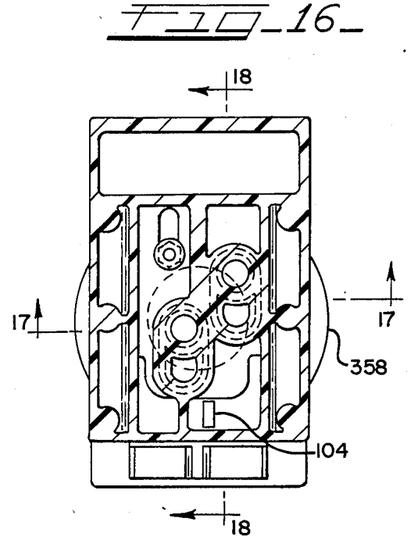
FIG. 16 is a cross-sectional plan view of the filter head assembly taken along line 16—16 of FIG. 17.
Figure 17:
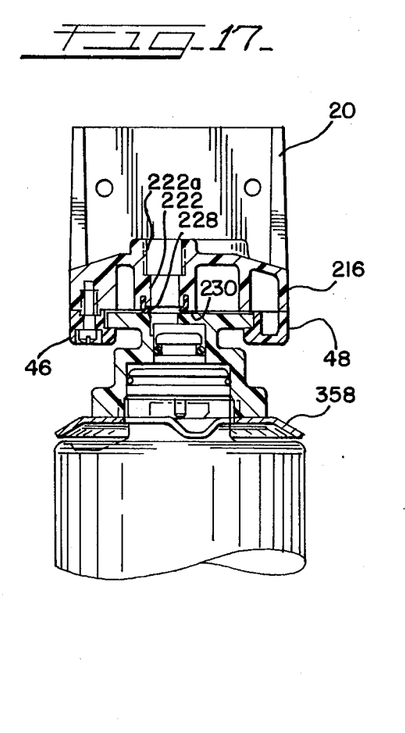
FIG. 17 is a front view in cross-section of the head member taken along line 17—17 of FIG. 16.
Figure 18:
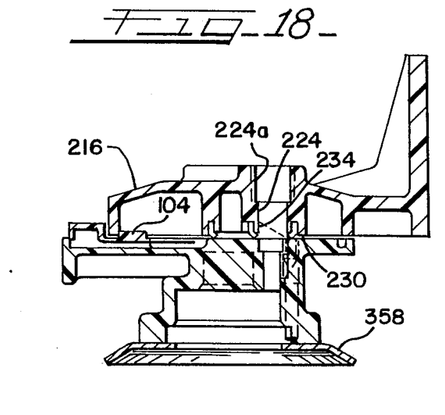
FIG. 18 is a cross-sectional view in elevation taken along line 18—18 of FIG. 16 showing the slide member disposed in association with the manifold member in a running position, comparable to the showing in FIG. 5.
Figure 19:
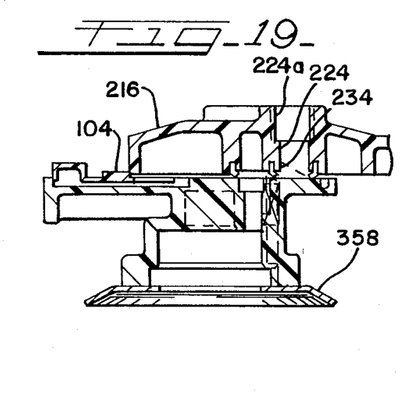
FIG. 19 is a view similar to that of FIG. 18 but showing the slide member in a load/unload position comparable to the showing in FIG. 6.

It will be appreciated that a slide member 218 modified to receive a filter cartridge with a closure member of the type shown in FIGS. 11-13 may also be used with a manifold member having vertically extending conduits as shown in FIGS. 14-19.

As is the case with the closure member 112, bayonet lugs 326 and 328 are formed on the closure member 312 and in conjunction with retainer plate 358 support the filter cartridge in the slide member 218.

Figure 6A:
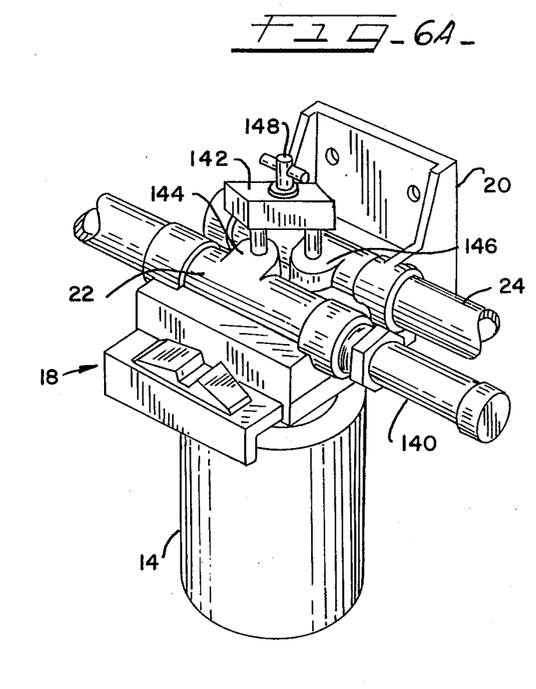
FIG. 6A is a perspective view of a filter assembly of the type shown in FIGS. 1-6.
Figure 6B:
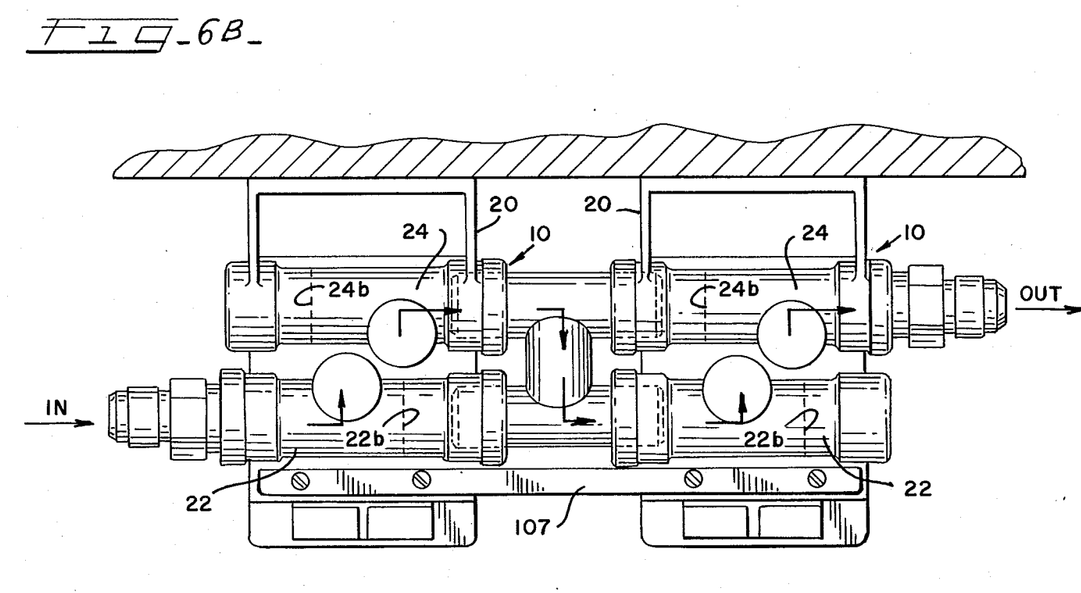
FIG. 6B is a plan view of two filter assembly head members embodying the invention herein, connected in series as part of a filtering system.

FIG. 6A is a general perspective view of a filter assembly of the type shown in FIGS. 1-6. Several accessory options may be added to such filter assembly units. Two such accessories are shown in FIG. 6A. For example, a water hammer arrestor 140 may be attached to the extended portion of the inlet coundit. Obviously if such an arrestor is attached, the partition 22b (see FIG. 4) in the inlet conduit would be removed. The arrestor which may of the type utilizing an air cushion chamber could be a particularly useful addition especially if rather high inlet fluid pressures are involved in the filtering system. The arrestor would be particularly effective in protecting the face seal members 36a and 36b against excessive pressure shocks and consequently in protecting against leakage between the manifold member and slide member.

In the event that two or more filter assemblies are connected in parallel as shown in FIG. 1, the arrestor would be advantageous to suppress fluid pressure shocks.

Another of the accessories that could be incorporated is a by-pass 142 which may be connected across both the inlet and outlet conduits 22 and 24 by drilling into the two bosses 144 and 146 and intersecting with the conduits 22 and 24. Such a by-pass may be useful in the event that continuous water flow, even though unfiltered, needs to be available to a connected appliance during a period when the filter cartridge is being removed to be replaced. Such by-pass may be equipped with a shut-off valve 148 or some other flow regulating device.

Instead of a by-pass, a pressure drop indicator may be installed across the inlet and outlet conduits. In that case, of course, a by-pass would not be installed The pressure drop indicator may function, for example, to indicate when a change of filter is necessary.

It will be apparent that we have advantageously provided an improved filter assembly which can be conveniently mounted as an individual filter assembly unit in a filtering system or can be mounted as one of several interconnected filter assembly units in parallel. The head assembly can be conveniently loaded or unloaded with a replaceable and/or disposable filter cartridge and placed in an operating or running position without the use of any tools. Multiple filter assemblies may be incorporated in a parallel arrangement in the filtering system allowing each unit to be individually serviced without interrupting the operation of the other units because an automatic shutoff of both influent and effluent is accomplished by means of the unique seal used between the manifold member and the slide member. The seal members between the manifold member and slide member have two zones of operation—one a flow-through zone where the ports are in line permitting flow of fluid and the other a shutoff zone where the ports in the slide member have moved out of line with the inlet and outlet ports in the manifold member In the latter position the manifold fluid flow is shut off and the inlet and outlet flow from the filter cartridge also is shut off. A latching means is provided to hold the slide member in either one of two positions—the load/unload position and the operating or running position. An interlocking mechanism is provided to hold the filter cartridge securely in the running position.

While certain preferred embodiments of the invention have been disclosed, it will be appreciated that these are shown by way of example only, and the invention is not to be limited thereto as other variations will be apparent to those skilled in the art and the invention is to be given its fullest possible interpretation within the terms of the following claims.

What is claimed is:

1. A filter assembly comprising:
  (a) a manifold member adapted to be fixedly mounted, said manifold member including fluid inlet and outlet conduits;
  (b) a pair of linearly extending rails connected to said manifold member for carrying a slide member thereon;
  (c) a push-pull slide member for supporting a filter cartridge therein, said slide member being slidably supported by said rails and movable linearly thereon, between a load/unload position and a running position;
  (d) a filter cartridge sealingly and releasably supported in said slide member, said filter cartridge having inlet and outlet ports formed in one end thereof;
  (e) means defining fluid passages in said slide member, for establishing fluid communication between inlet and outlet conduits in said manifold member and said filter cartridge when the slide member is in its running position.

2. The filter assembly of claim 1 including
face seal means disposed between said manifold member and said slide member.

3. The filter assembly of claim 2 wherein
said seal means is constructed and arranged to seal off both an influent and effluent flow when the slide member is in the load/unload position and to provide a seal between the inlet and outlet conduits and the slide member when the slide member is in a running position.

4. The filter assembly of claim 1, including
a pair of elastomeric face seal members disposed between said manifold member and said slide member, each of said seal members being supported in a lower face of said manifold member, one of said seal members being associated with the inlet conduit in said manifold member, the other of said seal members being associated with the outlet conduit in said manifold member, each of said seal members being in slidable sealing engagement with said slide member.

5. The filter assembly of claim 1 including
first seal means disposed between said filter cartridge and said slide member, and
second seal means disposed between said manifold member and said slide member.

6. The filter assembly of clair: 5 wherein
said second seal means is supported in said manifold member.

7. The filter assembly of claim 1, including
cooperating means on said manifold member and said slide member for limiting the travel of said slide member as it is moved between the load/unload position and the running position.

8. The filter assembly of claim 1 including
pin means connected to the manifold member,
means defining a slot formed in said slide member,
said pin means being engageable with said slot means for limiting the travel of said slide member as it is moved between the load/unload position and the running position.

9. The filter assembly of claim 1, including
latch means for holding the slide member either in a load/unload position or a running position with respect to the manifold member.

10. The filter assembly of claim 1, including
latch means mounted on said slide member and engageable with said manifold member for latching said slide member in either of two positions with respect to said manifold member.

11. The filter assembly of claim 10 wherein
said latch means includes detent means adapted to engage a portion of said manifold for latching the slide member in either the load/unload position or the running position.

12. The filter assembly of claim 1 including
a safety interlock means for securing the filter cartridge against rotation in the slide member when the slide member is in the running position.

13. The filter assembly of claim 1 wherein
said filter cartridge includes bayonet lug means formed thereon for supporting said filter cartridge in said slide member, and
said safety interlock means includes movable pin means positioned in said slide member and adapted as the slide member is moved to a running position to move into engagement with said bayonet lug means to prevent rotation out said filter cartridge.

14. The filter assembly of claim 13 including
means defining notch means formed in said bayonet lug means for accepting said movable pin means.

15. The filter assembly of claim 1, including
a first interlocking means for holding the slide member in a selected position with respect to the manifold member, and
a second interlocking means for securing the filter cartridge against rotation in the slide member when the slide member is in the running position.

16. The filter assembly of claim 1, including cartridge retaining means associated with said slide member, and
interacting means on said filter cartridge and said filter cartridge retaining means for retaining said filter cartridge in said slide member.

17. The filter assembly of claim 16 wherein
said interacting means on the filter cartridge includes
bayonet lug means formed on said filter cartridge, and further including
interlocking means for securing the filter cartridge against rotation when the slide member is in the running position,
said interlocking means including movable pin means positioned in said slide member and adapted as the slide member is moved to a running position to move into engagement with said bayonet lug means to prevent rotation of said filter cartridge 18. The filter assembly of clair: 1, including
a cartridge retaining plate connected to said slide member, and
interacting means on said filter cartridge and said cartridge retaining plate for retaining said filter cartridge in said slide member.

19. The filter assembly of claim 18 wherein
said interacting means includes a pair of bayonet lugs formed on said filter cartridge and shelf means on said cartridge retaining plate, said bayonet lugs being adapted to rest on said shelf means to retain said filter cartridge in said slide member.

20. The filter assembly of claim 18, including cam means on said cartridge retaining plate for urging said filter cartridge into sealed engagement with bore means in said slide member when the filter cartridge is inserted into said slide member.

21. The filter assembly of claim 1, including
pin means positioned in said slide member and adapted as the slide member is moved to a running position to be moved to a position to engage a portion of the filter cartridge and prevent rotation of the filter cartridge toward a release position.

22. The filter assembly of claim 21 wherein
said pin means is spring-loaded so that it will automatically retract to its unbiased position when the slide member is moved to a load/unload position thus allowing rotation of the filter cartridge to a position for removal from the slide member.

23. The filter assembly of claim 1, including
bayonet lug means formed on said filter cartridge, movable pin means positioned in said slide member and adapted as the slide member is moved to a running position to be moved into position to engage said bayonet lug means to prevent backward rotation of said filter cartridge.

24. The filter assembly of claim 1, including
a pair of circumferentially spaced bayonet lugs formed on said filter cartridge,
movable pin means positioned in said slide member and adapted as the slide member is moved to running position to be moved into position to engage one of said bayonet lugs to prevent backward rotation of said filter cartridge, and
notch means formed in at least one of said bayonet lugs for cooperating with said movable pin means.

25. The filter assembly of claim 1, including
bayonet lug means formed on said filter cartridge,
stop means formed on said slide member for limiting the forward rotation of the filter cartridge when it is inserted into the slide member, and
movable pin means positioned in said slide member and adapted as the slide member is moved to a running position to be moved into position to engage said bayonet lug means to block backward rotation of said filter cartridge.

26. The filter assembly of claim 1, including
face seal means disposed between said manifold member and said slide member;
a cartridge retaining plate connected to said slide member;
interacting means on said filter cartridge and said cartridge retaining plate for retaining said filter cartridge in said slide member;
said interacting means including a pair of bayonet lugs formed on said filter cartridge and shelf means on said cartridge retaining plate on which said bayonet lugs are adapted to rest;
interlocking means for securing the filter cartridge against rotation in the slide member when the slide member is in the running position,
said interlocking means including movable pin means positioned in said slide member and adapted as the slide member is moved to a running position to move into engagement with said bayonet lug means to prevent rotation of said filter cartridge.

27. The filter assembly of claim 26, including
notch means formed in said bayonet lug means for cooperating with said movable pin means.

28. In a head device for a filter assembly the combination comprising:
   (a) a manifold member adapted to be fixedly mounted, said manifold member including fluid inlet and outlet conduits;
   (b) a pair of linearly extending rails connected to said manifold member for carrying a slide member thereon;
   (c) a push-pull slide member for carrying a filter cartridge, said slide member being supported on said rails, and movable linearly on said rails between a load/unload position and a running position; and
   (d) means defining fluid passages extending through said slide member for establishing fluid communication between the inlet and outlet conduits in said manifold member and inlet and outlet passages in a filter cartridge with which said slide member is adapted to be associated.

29. The combination of claim 28 including
a fluid hammer arrestor operatively associated with the inlet conduit of said manifold member.

30. The combination of claim 28 including
a by-pass connected across the inlet and outlet conduits of said manifold member.

31. The combination of claim 28 including
a pressure drop indicator connected across the inlet and outlet conduits of said manifold member.

32. The combination of claim 28, including
face seal means disposed between said manifold member and said slide member.

33. The combination of claim 28, including
cooperating means on said manifold member and said slide member for limiting the linear travel of said slide member on said manifold member.

34. The combination of claim 33 wherein,
said cooperating means includes slot means formed in said slide member, and
pin means attached to said manifold member and engageable with said slot means.

35. The combination of claim 28, including
latch means associated with said slide member and said manifold member for securing said slide member in either one of two desired positions on said manifold member.

36. The combination of claim 28, including
latch means connected to said slide member for securing the slide member in either one of two positions on said manifold member.

37. The combination of claim 28 wherein
the fluid inlet and outlet conduits are substantially horizontally disposed.

38. The combination of claim 28 wherein
the fluid inlet and outlet conduits are vertically disposed.

39. The combination of claim 28, including
means on said slide member for supporting a filter cartridge therein; and
interlocking pin means disposed in said slide member for engaging a filter cartridge which said slide member is adapted to carry.

40. The combination of claim 39 wherein
said interlocking pin means is spring-biased to a nonengaging position, and further including
cam means on said manifold member for urging said interlocking pin means to a filter cartridge engaging position when said slide member is moved to a running position with respect to the manifold member.

41. In a filter assembly the combination comprising:
(a) a manifold member adapted to be fixedly mounted, said manifold member including inlet and outlet conduits and being adapted to be disposed in a fluid conduit;
(b) means defining a first planar surface formed on said manifold member;
(c) a filter cartridge supporting member operatively associated with said manifold member and linearly movable relative thereto between a load/unload position and a running position;
(d) means defining fluid passages in said filter cartridge supporting member for establishing fluid communication between said inlet and outlet conduits in said manifold member and inlet and outlet conduits in a filter cartridge adapted to be supported in said filter cartridge supporting member;
(e) means defining a second planar surface formed on said filter cartridge supporting member; and
(f) face seal means secured on the first planar surface of said manifold member and engageable with said second planar surface on said filter cartridge supporting member.

42. The combination of claim 41, including means interconnecting said manifold and said cartridge supporting member so that the cartridge supporting member may be moved to load/unload and running positions with respect to said manifold member.

43. The combination of claim 42 wherein
said means interconnecting said manifold and said cartridge supporting member includes a pair of linearly extending rail members attached to said manifold member and a pair of laterally extending projections formed on said filter cartridge supporting member for riding on said rail members.

44. The combination of claim 41, including
latch means for holding the filter cartridge supporting member either in a load/unload position or a running position with respect to the manifold member.

45. The combination of claim 41, including
a cartridge retaining plate connected to said cartridge supporting member, and,
means on said cartridge retaining plate for interacting with means on a filter cartridge for supporting the filter cartridge in the filter cartridge supporting member.

46. The combination of claim 45, including
cam means formed on said cartridge retaining plate for urging a filter cartridge being inserted into the cartridge supporting member into sealed engagement therewith.

47. A filter assembly comprising:
a filter cartridge retaining head member with an inlet and outlet which is adapted to be disposed in a fluid conduit and adapted to have a filter cartridge inserted thereinto;
a filter cartridge for insertion into said head member, said filter cartridge including a pressure vessel, a closure member secured in the open end of said pressure vessel and containing or adapted to contain a filter element and further including an inlet and outlet for communicating with said head member;
a pair of radially extending bayonet lugs formed on the outer surface of said closure member for cooperating with said head member to retain said filter cartridge in said head member; and
recess means formed on at least one of said bayonet lugs for accepting a movable pin means disposed in said head member to prevent rotation of the filter cartridge out of its operating position.

48. The filter assembly of claim 47 wherein
said recess means comprises an opening extending through said bayonet lug.

49. The filter assembly of claim 47 wherein
said recess means comprises notch means formed in the edge of said bayonet lug.

50. In a filter assembly the combination comprising:
a filter cartridge for insertion into a filter cartridge retaining head member having an inlet and outlet and which is adapted to be disposed in a fluid conduit, said filter cartridge including a pressure vessel, a closure member secured in the open end of said pressure vessel and containing or adapted to contain a filter element and further including an inlet and outlet for communicating with the head member;
a pair of radially extending bayonet lugs formed on the outer surface of said closure member for cooperating with the head member to retain said filter cartridge in the head member; and
recess means formed on at least one of said bayonet lugs for accepting a movable pin means disposed in said head member to prevent rotation of the filter cartridge out of its operating position in the head member.

51. The combination of claim 50 wherein
said recess means comprises an opening extending through said bayonet lug, 52. The combination of claim 50 wherein
said recess means comprises notch means formed in the edge of said bayonet lug.

53. A filtering system comprising
a plurality of filter assemblies, each of said filter assemblies including a manifold member, a filter cartridge supporting member associated with the manifold member and a filter cartridge inserted into said filter cartridge supporting member;
each of said filter cartridge supporting members being adapted to selectively assume a load/unload position or a running position with respect to its associated manifold member,
conduit means interconnecting the manifolds of said filter assemblies;
automatic fluid shut-off means provided in each of said filter assemblies,
said automatic fluid shut-off means comprising a pair of seal members disposed between the manifold member and the filter cartridge supporting member in each filter assembly, said seal members being effective to shut-off both influent and effluent in a particular filter assembly when the filter cartridge supporting member of said particular filter assembly is moved to a load/unload position.

54. The filtering system of claim 53 wherein
each of said filter cartridges includes bayonet lug means formed thereon for supporting said filter cartridge in said filter cartridge supporting member, and further including
a safety interlock means for securing the filter cartridge against rotation in the filter cartridge supporting member when the latter is in a running position,
said safety interlock means including movable pin means positioned in said filter cartridge supporting member and adapted as the filter cartridge supporting member is moved to a running position to move into engagement with said bayonet lug means to prevent rotation of said filter cartridge.

55. The filtering system of claim 54 including
means defining recess means formed in said bayonet lug means for accepting said movable pin means.

56. The filtering system of claim 55 wherein
said movable pin means of said safety interlock means are positioned in different locations in the respective filter cartridge supporting members, and
said recess means in said bayonet lug means are positioned at correspondingly different locations in the respective filter cartridges in the filtering system, whereby filter cartridges containing different types of filter elements are easily identifiable for positioning in selective positions in the various filter assemblies in the filtering system.

57. The filter system of claim 53 wherein
said conduit means interconnecting the manifolds of said filter assemblies are connected to provide a parallel arrangement.

58. The filtering system of claim 57 wherein
any one of said filter assemblies may be individually serviced without disrupting the flow through the remaining filter assemblies in the filter system.

59. The filtering system of claim 53 wherein
said conduit means interconnecting the manifolds of said filter assemblies are connected to provide a series arrangement.

60. The filtering system of claim 53 wherein
each of said filter cartridge supporting members comprises a push-pull slide member mounted adjacent said manifold member for sliding engagement therewith.

61. A filter cartridge for insertion into a filter head member having a fluid inlet and outlet comprising:
a pressure vessel adapted to contain a filter element therein;
a closure member secured in the open end of said pressure vessel, said closure member including coaxially disposed first and second tubular portions radially spaced from each other to define an opening therebetween, said first tubular portion defining a fluid inlet opening therethrough to the pressure vessel, and said opening between said first and second tubular portions defining a fluid outlet opening from said pressure vessel;
a pair of radially extending bayonet lugs formed on the outer surface of said closure member for cooperating with the head member and to retain the filter cartridge in the head member with which the filter cartridge is adapted to be associated; and
recess means formed on at least one of said bayonet lugs for accepting a movable pin means disposed in the head member to prevent rotation of the filter cartridge out of its operating position.

62. The filter cartridge of claim 61 wherein
said recess means comprises an opening extending through said bayonet lug.

63. The filter cartridge of claim 61 wherein
said recess means comprises notch means formed in the edge of said bayonet lug.

* * * * *

UNITED STATES PATENT AND TRADEMARK OFFICE
CERTIFICATE OF CORRECTION

PATENT NO. : 4,904,382
DATED : February 27, 1990
INVENTOR(S) : Jack W. Thomsen

It is certified that error appears in the above-identified patent and that said Letters Patent is hereby corrected as shown below: Title page:

Change title to read --Filter Cartridge and Head Therefor, Including Push-Pull Cartridge Retaining Slide Member--.

Signed and Sealed this

Nineteenth Day of June, 1990

Attest:

HARRY F. MANBECK, JR.

*Attesting Officer*      *Commissioner of Patents and Trademarks*